United States Patent
Ito et al.

(10) Patent No.: US 10,960,310 B2
(45) Date of Patent: Mar. 30, 2021

(54) PROGRAM, COMPUTER APPARATUS, PROGRAM EXECUTION METHOD, AND COMPUTER SYSTEM

(71) Applicant: SQUARE ENIX CO., LTD., Tokyo (JP)

(72) Inventors: Kazuki Ito, Tokyo (JP); Yusuke Shimizu, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 0 days.

(21) Appl. No.: 16/302,407

(22) PCT Filed: Dec. 22, 2016

(86) PCT No.: PCT/JP2016/088520
§ 371 (c)(1),
(2) Date: Nov. 16, 2018

(87) PCT Pub. No.: WO2017/199460
PCT Pub. Date: Nov. 23, 2017

(65) Prior Publication Data
US 2019/0275426 A1     Sep. 12, 2019

(30) Foreign Application Priority Data
May 18, 2016 (JP) .............................. JP2016-099388

(51) Int. Cl.
*A63F 13/5255* (2014.01)
*A63F 13/213* (2014.01)
(Continued)

(52) U.S. Cl.
CPC ........ *A63F 13/5255* (2014.09); *A63F 13/213* (2014.09); *A63F 13/428* (2014.09);
(Continued)

(58) Field of Classification Search
CPC ..................... A63F 2300/1062; A63F 13/53
See application file for complete search history.

(56) References Cited

U.S. PATENT DOCUMENTS

| | | |
|---|---|---|
| 8,388,139 B2 | 3/2013 | LaDuke |
| 2004/0176164 A1 | 9/2004 | Kobayashi |

(Continued)

FOREIGN PATENT DOCUMENTS

| | | |
|---|---|---|
| CN | 1809801 | 7/2006 |
| CN | 101549207 | 10/2009 |

(Continued)

OTHER PUBLICATIONS

International Search Report (ISR) from International Searching Authority (Japan Patent Office) in International Pat. Appl. No. PCT/JP2016/088520, dated Mar. 21, 2017.

(Continued)

*Primary Examiner* — Reginald A Renwick
(74) *Attorney, Agent, or Firm* — Greenblum & Bernstein, P.L.C.

(57) ABSTRACT

A highly attractive program, a computer apparatus, a program execution method, and a system that allow a user to experience a virtual world full of the realistic feeling are provided. Provided is a program to be executed on a computer apparatus capable of communicating or connecting with a projector that projects a projection image onto a projected surface, the program causing the computer apparatus to function as: a specific point position changer that changes a position of a specific point for specifying the projection image to be projected onto the projected surface; and a transmitter that transmits an image in accordance with the position of the specific point to a projector as the projection image.

16 Claims, 9 Drawing Sheets

(51) Int. Cl.
*A63F 13/428* (2014.01)
*H04N 5/74* (2006.01)
*A63F 13/525* (2014.01)
*G06T 19/00* (2011.01)

(52) U.S. Cl.
CPC ............ *A63F 13/525* (2014.09); *G06T 19/00* (2013.01); *H04N 5/74* (2013.01)

(56) References Cited

U.S. PATENT DOCUMENTS

| | | | |
|---|---|---|---|
| 2006/0082546 | A1 | 4/2006 | Wey |
| 2009/0253507 | A1 | 10/2009 | Ishii et al. |
| 2010/0309391 | A1* | 12/2010 | Plut ...................... H04N 9/3117 348/756 |
| 2011/0018867 | A1 | 1/2011 | Shibamiya et al. |
| 2011/0263329 | A1 | 10/2011 | Miyazaki et al. |
| 2012/0156652 | A1* | 6/2012 | Lane .......................... F41J 9/14 434/11 |
| 2013/0109451 | A1 | 5/2013 | Hamano et al. |
| 2014/0235349 | A1 | 8/2014 | Miyazaki et al. |
| 2016/0023110 | A1 | 1/2016 | Tawarayama et al. |
| 2016/0080710 | A1 | 3/2016 | Hattingh et al. |
| 2016/0246061 | A1* | 8/2016 | Bickerstaff ............. G06F 3/012 |

FOREIGN PATENT DOCUMENTS

| | | |
|---|---|---|
| CN | 101961554 | 2/2011 |
| CN | 102282528 | 12/2011 |
| CN | 103002962 | 3/2013 |
| CN | 105103034 | 11/2015 |
| CN | 105188866 | 12/2015 |
| CN | 105488839 | 4/2016 |
| EP | 1454663 | 9/2004 |
| JP | 4-204842 | 7/1992 |
| JP | 9-138637 | 5/1997 |

OTHER PUBLICATIONS

Office Action from Japan Patent Office (JPO) in Japanese Patent Appl. No. 2016-99388, dated Aug. 1, 2017, together with a partial English language translation.

Office Action from Japan Patent Office (JPO) in Japanese Patent Appl. No. 2016-99388, dated May 8, 2018, together with a partial English language translation.

Extended European Search Report from European Patent Office (EPO) in European Patent Appl. No. 16902478.3, dated Oct. 31, 2019.

Trial and Appeal Decision from Japan Patent Office (JPO) in Japanese Patent Appl. No. 2016-099388, dated Jan. 7, 2020, together with an English language translation.

Infocus Corporation, "Microsoft Xbox 360—InFocus How-To Guide", Jan. 1, 2006 (retrieved Oct. 23, 2019), available at http://www.technologyequipmentrental.com/pdf/infocus_xbox360_how_toguide_videogaming_en.pdf.

Cruz-Neira, "The Cave Audio Visual Experience Automatic Virtual Environment", Communications of the ACM, Association for Computing Machinery, Inc., United States, vol. 35, No. 6, Jun. 1, 1992, XP000331753,ISSN:0001-0782, DOI:10.1145/129888.129892, figure 4, p. 70.

Office Action from China National Intellectual Property Administration in Chinese Patent Application No. 201680085784.X, dated May 7, 2020, together with an English language translation.

Office Action from China National Intellectual Property Administration in Chinese Patent Application No. 201680085784.X, dated Dec. 30, 2020, together with a partial English language translation.

* cited by examiner

PROGRAM, COMPUTER APPARATUS, PROGRAM EXECUTION METHOD, AND COMPUTER SYSTEM

TECHNICAL FIELD

The present invention relates to a program, a computer apparatus, a program execution method, and a computer system.

BACKGROUND ART

In the related art, projection mapping (also called video mapping, mapping projection) technique that projects computer graphics (hereinafter, referred to as CG) onto a building, an object, a space or the like (hereinafter, referred to as a building or the like) using a projector capable of projecting an image on a projected surface is known.

In addition to projecting an image on a projected surface, a technique of changing the projected image is known. For example, Patent Literature 1 discloses a system in which a guide image is projected onto a surface of sand in a container by a projector, when a user creates a modeled object according to the guide image, the changed image is projected onto the modeled object in accordance with a shape of the created modeled object.

CITATION LIST

Patent Literature

Patent Literature 1: U.S. Pat. No. 8,388,139 B

SUMMARY OF INVENTION

Technical Problem

Generally, the projection mapping is to passively enjoy the image to be projected (hereinafter, referred to as the projection image), and the user cannot change the image. In addition, the technique disclosed in Patent Literature 1 merely measures information (for example, a height of the sand) of a real world and changes the projection image according to the measured information. Therefore, the user cannot experience a realistic feeling that the user is moving through the virtual world.

An object of at least one embodiment of the present invention is to provide a highly attractive program, a computer apparatus, a program execution method, and a system that allow a user to experience a virtual world full of the realistic feeling.

Solution to Problem

According to a non-limiting aspect, a program to be executed on a computer apparatus capable of communicating or connecting with a projector that projects a projection image onto a projected surface, the program causing the computer apparatus to function as: a specific point position changer that changes a position of a specific point for specifying the projection image to be projected onto the projected surface; and a transmitter that transmits an image in accordance with the position of the specific point to a projector as the projection image.

According to a non-limiting aspect, a computer apparatus capable of communicating or connecting with a projector that projects a projection image onto a projected surface, the apparatus comprising: a specific point position changer that changes a position of a specific point for specifying the projection image to be projected onto the projected surface; and a transmitter that transmits an image in accordance with the position of the specific point to a projector as the projection image.

According to a non-limiting aspect, a program execution method to be executed on a computer apparatus capable of communicating or connecting with a projector that projects a projection image onto a projected surface, the method comprising: a step of changing a position of a specific point for specifying the projection image to be projected onto the projected surface; and a step of transmitting an image in accordance with the position of the specific point to a projector as the projection image.

According to a non-limiting aspect, a computer system comprising: a projector that projects a projection image onto a projected surface; and a computer apparatus capable of communicating or connecting with the projector, wherein the computer apparatus includes a specific point position changer that changes a position of a specific point for specifying the projection image to be projected onto the projected surface, and a transmitter that transmits an image in accordance with the position of the specific point to a projector as the projection image, and wherein the projector includes a projecting unit that projects the received image onto the projected surface.

Advantageous Effects of Invention

One or more of the above problems can be solved with each embodiment of the present invention.

DESCRIPTION OF EMBODIMENTS

Hereinafter, embodiments of the invention will be described with reference to the accompanying drawings. Hereinafter, description relating to effects shows an aspect of the effects of the embodiments of the invention, and does not limit the effects. Further, the order of respective processes that form a flowchart described below may be changed in a range without contradicting or creating discord with the processing contents thereof.

First Embodiment

Figure 1:
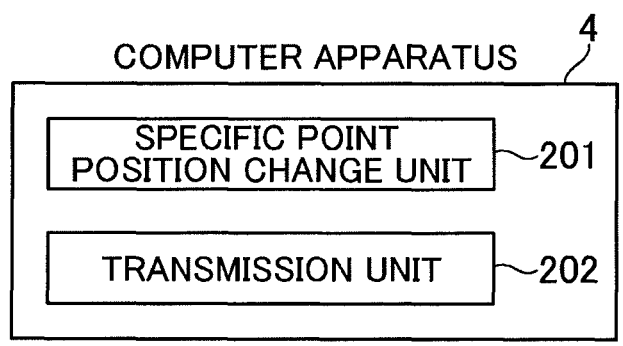
FIG. 1 is a block diagram illustrating a configuration of a computer apparatus corresponding to at least one of the embodiments of the present invention.

Next, the outline of a first embodiment of the present invention will be described. FIG. 1 is a block diagram illustrating a configuration of a computer apparatus corresponding to at least one of the embodiments of the present invention. A computer apparatus 4 includes at least a specific point position change unit 201 and a transmission unit 202.

The specific point position change unit 201 has a function of changing the position of a specific point for specifying a projection image to be projected on a projected surface. The transmission unit 202 has a function of transmitting an image corresponding to the position of the specific point to the projector as the projection image.

Figure 2:
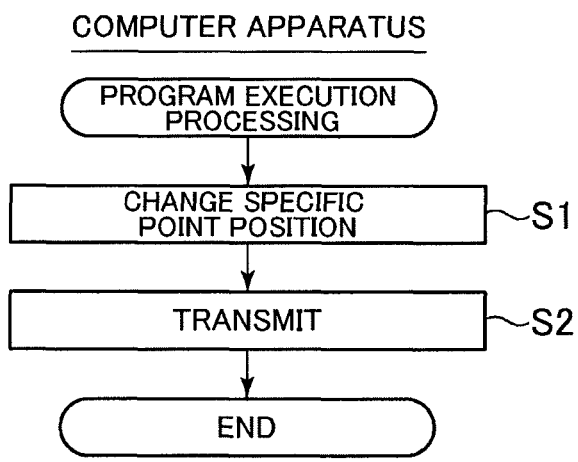
FIG. 2 is a flowchart of a program execution processing corresponding to at least one of the embodiments of the present invention.

Program execution processing according to the first embodiment of the present invention will be described. FIG. 2 is a flowchart of a program execution processing corresponding to at least one of the embodiments of the present invention.

The computer apparatus 4 changes the position of the specific point for specifying the projection image projected by the projector on the projected surface (step S1). Next, an image corresponding to the position of the specific point changed in step S1 is transmitted as a projection image to the projector (step S2), and the process is terminated.

As one aspect of the first embodiment, the user can experience a realistic feeling that the user is moving in the virtual world, thereby enhancing user's interest.

In the first embodiment, the "projection" refers to, for example, displaying a figure on a plane or a curved surface. The "image" is, for example, a figure, a photograph, an image, a graphic, and the like, and it may be either a still image or a moving image. The "projected surface" refers to, for example, a plane or a curved plane on which an image can be projected.

The "projector" means a device such as a projector capable of projecting. The "communication" means to transmit and receive data by wired or wireless communication, for example. The "connection" means enabling communication between devices via a transmission medium such as a cable, for example. The "computer apparatus" refers to, for example, a device capable of processing arithmetic in accordance with execution of a program, and refers to a device connectable to another device by communication.

The "specific point" refers to, for example, a point used for specifying the projection image to be projected on the projected surface, including a position in a virtual space of a user character and the like. The "changing the position" means, for example, changing the information on the position to the information different from the current information. The "transmission" refers to sending an electric signal, for example, a concept including transforming electronic information into an electric signal and sending it to another device.

Second Embodiment

Figure 3:
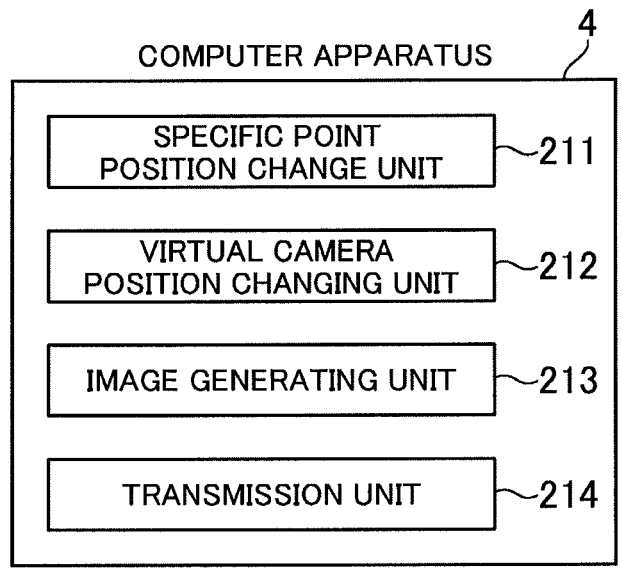
FIG. 3 is a block diagram illustrating a configuration of a computer apparatus corresponding to at least one of the embodiments of the present invention.

Next, the outline of a second embodiment of the present invention will be described. FIG. 3 is a block diagram illustrating a configuration of a computer apparatus corresponding to at least one of the embodiments of the present invention. The computer apparatus 4 includes at least a specific point position changing unit 211, a virtual camera position changing unit 212, an image generating unit 213, and a transmission unit 214.

The specific point position changing unit 211 has a function of changing the position of a specific point for specifying the projection image to be projected on the projected surface. The virtual camera position changing unit 212 has a function of changing the position of the virtual camera in accordance with the change of the position of the specific point.

The image generating unit 213 has a function of performing perspective transformation of the virtual three-dimensional space from the virtual camera onto the virtual screen to generate an image. The transmission unit 214 has a function of transmitting the generated image as a projection image to the projector.

Figure 4:
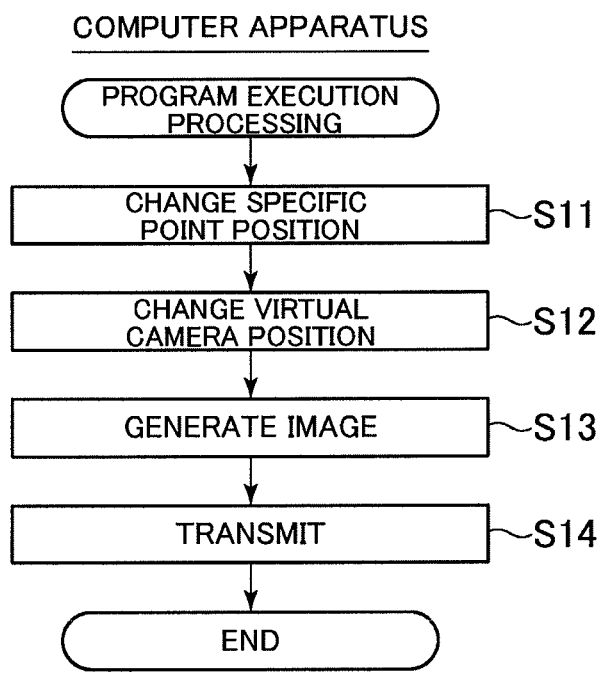
FIG. 4 is a flowchart of a program execution processing corresponding to at least one of the embodiments of the present invention.

Program execution processing according to the second embodiment of the present invention will be described. FIG. 4 is a flowchart of a program execution processing corresponding to at least one of the embodiments of the present invention.

The computer apparatus 4 changes the position of a specific point for specifying the projection image projected by the projector on the projected surface (step S11). Next, the position of the virtual camera is changed to the position of the specific point changed in step S11 (step S12).

Further, an image is generated by perspective transformation of the virtual three-dimensional space from the virtual camera onto the virtual screen (step S13). Then, the image generated in step S13 is transmitted as a projection image to the projector (step S14), and the process is terminated.

As one aspect of the second embodiment, by changing the position of a specific point for specifying the projection image to be projected on the projected surface and changing the position of the virtual camera according to the position of the specific point, it is possible to provide a feeling that the user is moving in the virtual world and it is possible to enhance the realistic feeling of the projection image and further enhance the user's interesting.

In the second embodiment, the "projection", "image", "projected surface", "projector", "communication", "connection", "computer apparatus", "specific point", "change position" and "transmission" are the same as those described in the first embodiment, respectively.

In the second embodiment, the "virtual three-dimensional space" refers to, for example, a virtual space on a computer, which is expressed in three dimensions. The "virtual camera" means, for example, a viewpoint or angle of view when drawing a CG as compared with a camera. The "virtual screen" means, for example, a two-dimensional plane for projecting a scene in a virtual world photographed by a virtual camera as a planar image.

In the second embodiment, "perspective transformation" means a method of photographing a virtual three-dimensional space from any viewpoint such as a virtual camera and transforming it into a two-dimensional image having a perspective. The "generating an image" means to draw an image based on, for example, information as a material.

Third Embodiment

Next, the outline of a third embodiment of the present invention will be described. In the third embodiment, at least two projected surfaces are provided, and one projected surface and the other projected surface are disposed to have a predetermined angle.

Figure 5:
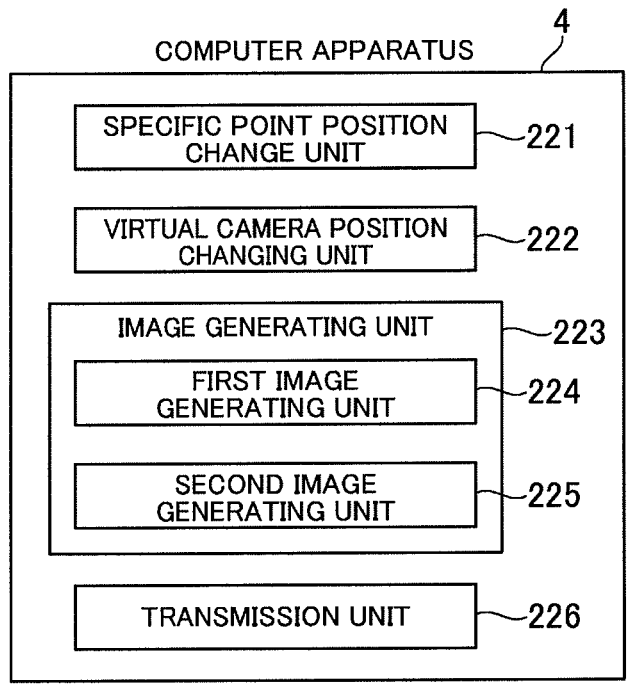
FIG. 5 is a block diagram illustrating a configuration of a computer apparatus corresponding to at least one of the embodiments of the present invention.

FIG. 5 is a block diagram illustrating a configuration of a computer apparatus corresponding to at least one of the embodiments of the present invention. The computer apparatus 4 includes at least a specific point position changing unit 221, a virtual camera position changing unit 222, an image generating unit 223, a first image generating unit 224, a second image generating unit 225, and a transmission unit 226.

The specific point position changing unit 221 has a function of changing the position of a specific point for specifying the projection image to be projected on the projected surface. The virtual camera position changing unit 222 has a function of changing the position of the virtual camera in accordance with the change of the position of the specific point.

The image generating unit 223 has a function of performing perspective transformation of the virtual three-dimensional space from the virtual camera onto the virtual screen to generate an image. The first image generating unit 224 has a function of performing perspective transformation from the first virtual camera corresponding to one projected surface onto the first virtual screen to generate an image. The second image generating unit 225 has a function of performing perspective transformation from the second virtual camera corresponding to the other projected surface onto the second virtual screen to generate an image. The transmission unit 226 has a function of transmitting the generated image as a projection image to the projector.

Figure 6:
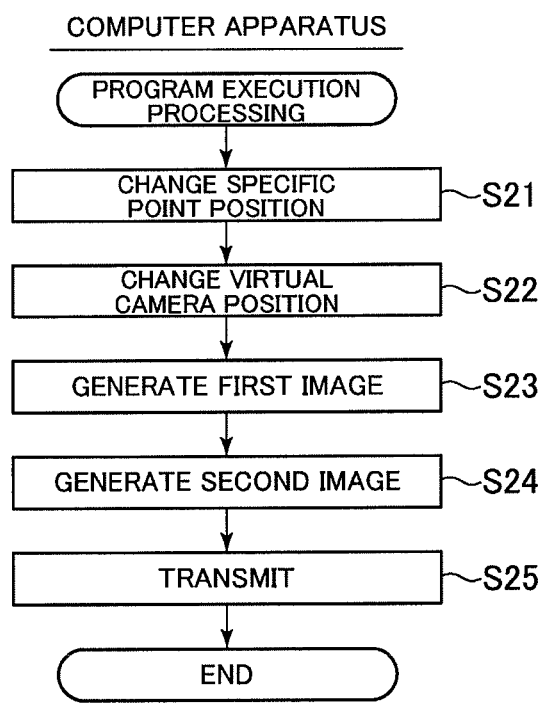
FIG. 6 is a flowchart of a program execution processing corresponding to at least one of the embodiments of the present invention.

Program execution processing according to the third embodiment of the present invention will be described. FIG. 6 is a flowchart of a program execution processing corresponding to at least one of the embodiments of the present invention.

The computer apparatus 4 changes the position of a specific point for specifying the projection image projected by the projector on the projected surface (step S21). Next, the position of the virtual camera is changed to the position of the specific point changed in step S21 (step S22).

Further, an image is generated by perspective transformation of the virtual three-dimensional space from the first virtual camera corresponding to one projected surface onto the first virtual screen (step S23). In addition, an image is generated by perspective transformation from the second virtual camera corresponding to the other projected surface onto the second virtual screen (step S24).

Then, the images generated in steps S23 and S24 are transmitted as a projection image to the projector (step S25), and the process is terminated.

In the third embodiment, the relative positional relationship of the first virtual screen to the first virtual camera and the relative positional relationship of the second virtual screen to the second virtual camera are the same, and the first virtual screen and the second virtual screen have the same angle as the predetermined angle.

As one aspect of the third embodiment, two or more projected surfaces are disposed with a predetermined angle, the relative positional relationship of the first virtual screen to the first virtual camera and the relative positional relationship of the second virtual camera to the second virtual screen are the same, and the virtual screens have the same angle as the angle formed by the projected surfaces. Therefore, since the positional relationship between the projected surfaces in the real world and the positional relationship between the virtual cameras in the virtual world can be made to correspond to each other, it is possible to project the state of the virtual world on a plurality of projected surfaces without causing discomfort.

In the third embodiment, the "projection", "image", "projected surface", "projector", "communication", "connection", "computer apparatus", "specific point", "change position" and "transmission" are the same as those described in the first embodiment, respectively.

In the third embodiment, the "virtual three-dimensional space", "virtual camera", "virtual screen", "perspective transformation" and "generating an image" are the same as those described in the second embodiment, respectively.

In the third embodiment, "dispose" means, for example, providing the projected surface. The "angle" means, for example, the angle formed by the disposed projected surfaces. The "relative positional relationship" means, for example, a relationship determined by a distance and a difference in height between two objects, or the like.

Fourth Embodiment

Next, the outline of the fourth embodiment of the present invention will be described. The configuration of the computer apparatus according to the fourth embodiment can adopt the same configuration as that illustrated in the block diagram of FIG. 3. Further, the flow of the program execution processing in the fourth embodiment can adopt the same configuration as that illustrated in the flowchart of FIG. 4.

In the fourth embodiment, the virtual camera position changing unit 212 changes the position of the virtual camera while maintaining the relative positional relationship of the virtual camera to the specific point.

As one aspect of the fourth embodiment, by changing the position of the virtual camera while maintaining the relative positional relationship of the virtual camera to the specific point, in a case where the specific point is changed by the user's operation instruction or program instruction, the position of the virtual camera can be changed according to the position of the specific point. Since the projected image changes, it is possible for the user to feel like moving in the virtual world.

In the fourth embodiment, "projection", "image", "projected surface", "projector", "communication", "connection", "computer apparatus", "specific point", "change position", and "transmission" are the same as those described in the first embodiment, respectively.

In the fourth embodiment, the "virtual three-dimensional space", "virtual camera", "virtual screen", "perspective transformation" and "generating an image" are the same as those described in the second embodiment, respectively.

Fifth Embodiment

Next, the outline of a fifth embodiment of the present invention will be explained. In the fifth embodiment, at least two projected surfaces are provided, and one projected surface and the other projected surface are set to have a predetermined angle.

Figure 7:
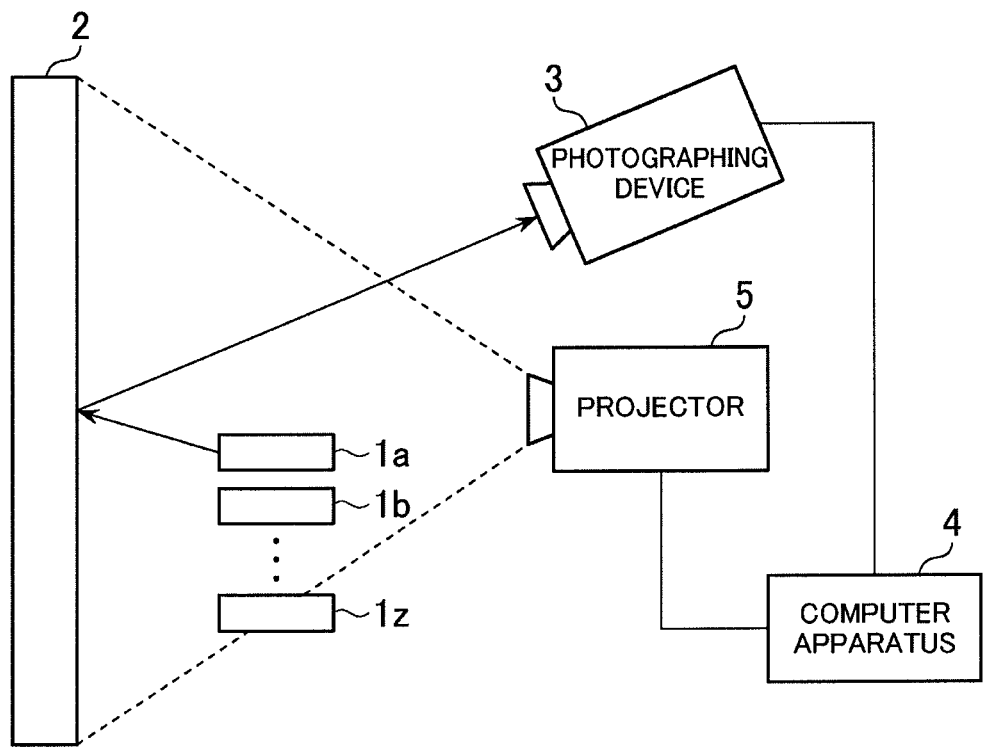
FIG. 7 is a block diagram illustrating a configuration of a system corresponding to at least one of the embodiments of the present invention.

Next, the outline of the fifth embodiment of the present invention will be described. FIG. 7 is a block diagram illustrating a configuration of a system corresponding to at least one of the embodiments of the present invention. As illustrated in the figure, a system includes a plurality of light beam irradiation devices 1 (light beam irradiation devices 1a, 1b, . . . , and 1z), a projected surface 2 that irradiates a light beam and projects an image from the projector, a photographing device 3 that photographs a light beam irradiated from the light beam irradiation device 1 to the projected surface 2 and reflected therefrom, a computer apparatus 4 that performs processing based on information on the photographed light beam, and a projector 5 that projects an image processed by the computer apparatus 4 onto the projected surface 2.

The light beam irradiation device 1 can be used independently without being connected to other devices and the like, may be capable of communicating with the computer apparatus 4, and may be capable of transmitting an input signal to the computer apparatus 4 by a mechanism provided in the light beam irradiation device 1 for inputting instructions from the user. Further, the light beam irradiation device 1 may irradiate invisible light, may irradiate visible light, or may irradiate both.

The projected surface 2 is preferably made of a material capable of reflecting the irradiated light beam from the light beam irradiation device 1. The photographing device 3 is connected to the computer apparatus 4 via a wired or wireless communication line. The computer apparatus 4 is connected to the photographing device 3 and the projector 5 via a wired or wireless communication line. The projector 5 is connected to the computer apparatus 4 via a communication line. The photographing device 3, the computer apparatus 4, and the projector 5 may be independent from each other, or may be a composite single apparatus.

As an example of the present embodiment, the light beam irradiation device 1 can be a device capable of irradiating two kinds of visible light beams and invisible light beam (for example, infrared light beam or the like). By irradiating visible light beam, the user can easily grasp the irradiated position by the user. In addition, by irradiating the invisible light beam, the light beam irradiation device 1 can be identified without being affected by the projected image.

As an example of this embodiment, an infrared ray can be used as the invisible light beam of the light beam irradiation device 1, and an infrared sensor camera can be used for the photographing device 3. Here, it is possible to attach a filter to the camera so that the infrared ray emitted from a player does not disturb the operation. This is intended to cut wavelengths around 9 to 10 μm corresponding to infrared rays emitted by a human body. It is preferable to set the wavelength of the infrared light beam emitted from the light beam irradiation device 1 so as not to be included in the wavelength range to be cut.

Figure 8:
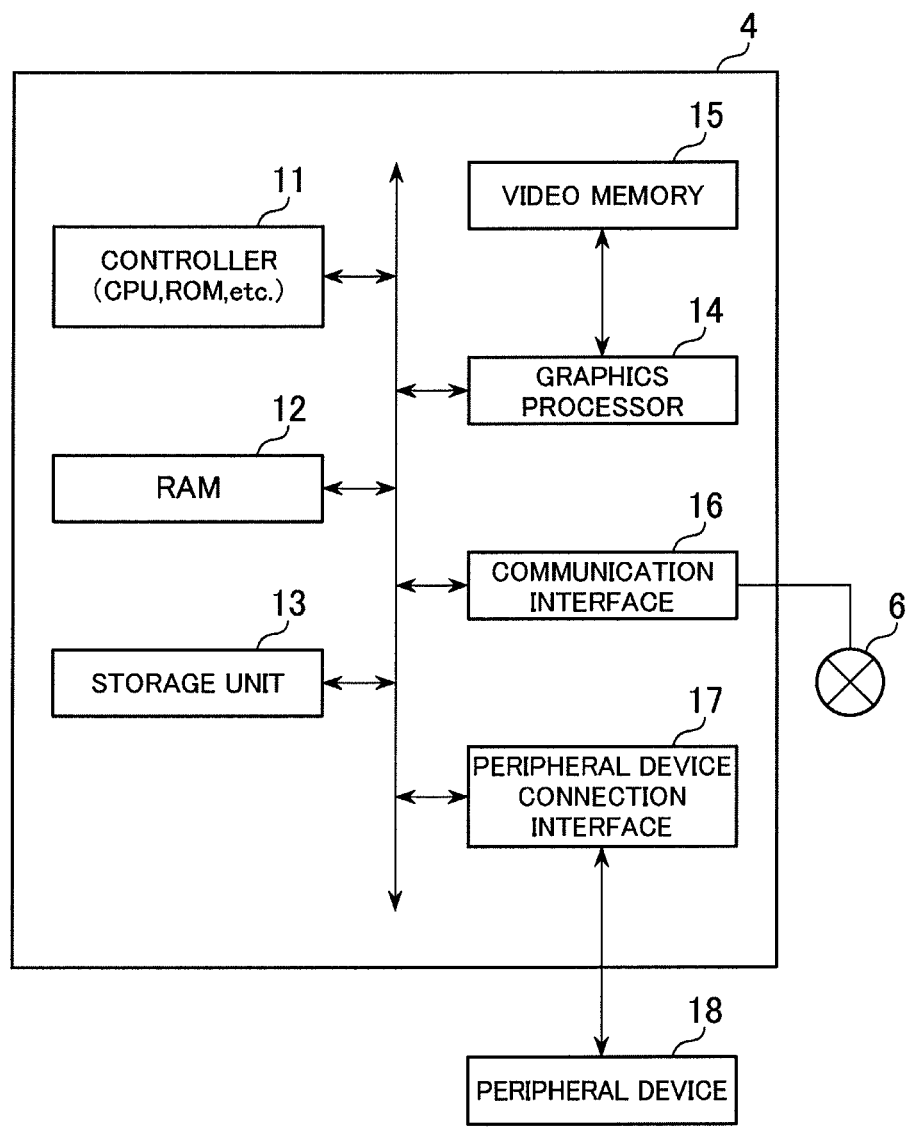
FIG. 8 is a block diagram illustrating a configuration of a computer apparatus corresponding to at least one of the embodiments of the present invention.

FIG. 8 is a block diagram illustrating a configuration of a computer apparatus corresponding to at least one of the embodiments of the present invention. The computer apparatus 4 includes a controller 11, a random access memory (RAM) 12, a storage unit 13, a graphics processor 14, a video memory 15, a communication interface 16, a peripheral device connection interface 17, and a peripheral device 18, and these are connected to each other by an internal bus.

The controller 11 is constituted by a Central Processing Unit (CPU) and a Read Only Memory (ROM). The controller 11 executes a program stored in the storage unit 13, and performs the control of the computer apparatus 4. The RAM 12 is a work area of the controller 11. The storage unit 13 is a storage region for storing programs and data.

The controller 11 reads out the programs and data from the RAM 12 and processes the read-out programs and data. The controller 11 processes the programs and data which are loaded into the RAM 12 to output a drawing command to the graphics processor 14.

The graphics processor 14 executes drawing of one image in frame units. One frame time of the image is, for example, one thirtieth of a second. The graphics processor 14 has a role of taking charge of a portion of a computational process related to drawing, and distributing a burden of the entire system.

The peripheral device 18 (for example, an SD card, a photographing camera, or the like) is connected to the peripheral device connection interface 17. The data read from the peripheral device 18 is loaded into the RAM 12, and the arithmetic processing is executed by the controller 11.

The communication interface 16 can be connected to a communication line 6 wirelessly or by wire, and can receive data via the communication line 6. The data received via the communication interface 16 is loaded into the RAM 12 in the same manner as the data read from the peripheral device 18, and the controller 11 carries out arithmetic processing.

Program execution processing according to the fifth embodiment of the present invention will be described. As an example of the fifth embodiment of the present invention, a game program expressing a virtual world by hanging the projector from the ceiling and projecting the image on a wall surface and a floor surface can be mentioned. The user can perform the input operation by irradiating the image projected on the wall surface with the light beam from the light beam irradiation device. In the virtual world, an object such as a character that can be operated by the user may exist.

Figure 9:
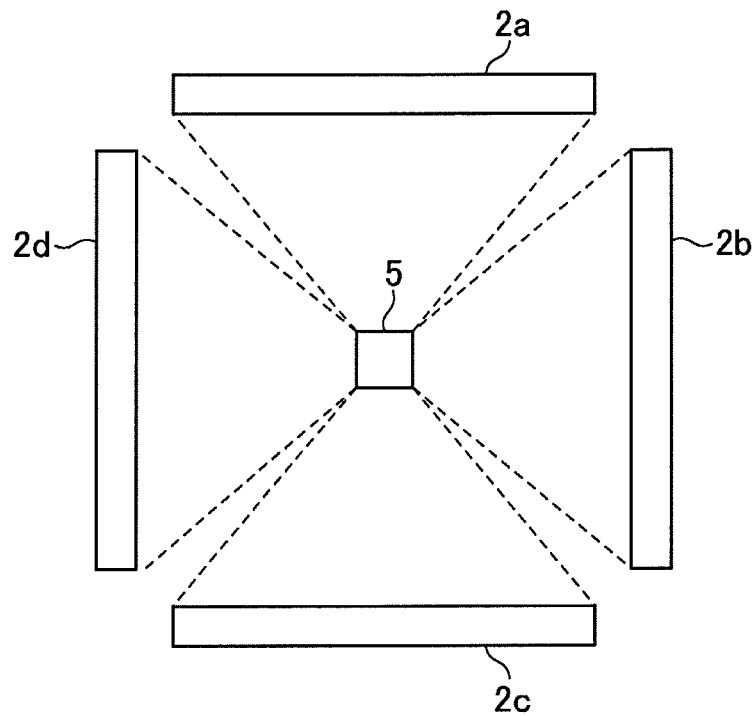
FIGS. 9A and 9B are block diagrams illustrating a state in which an image is projected from a projector onto a projected surface corresponding to at least one of the embodiments of the present invention.
Figure 9:
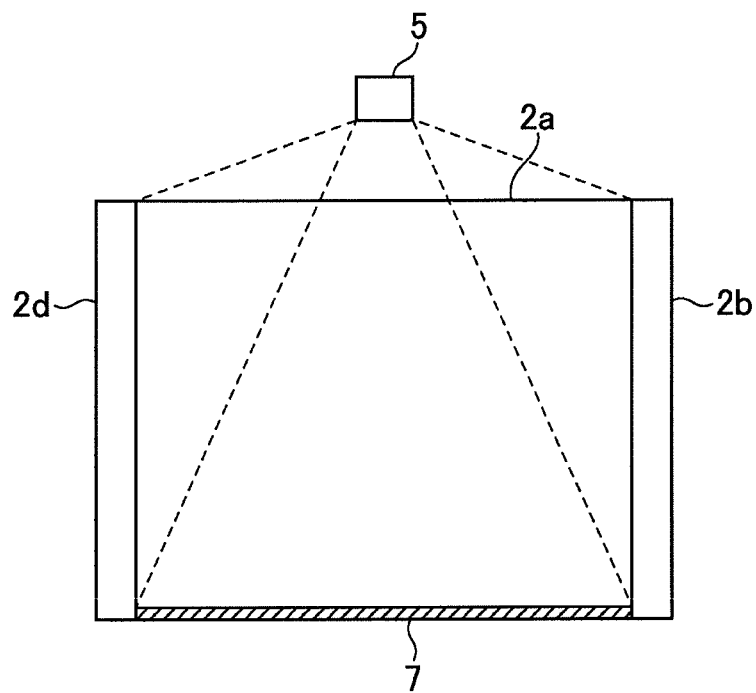

FIG. 9 are block diagrams illustrating a state in which an image is projected from the projector onto the projected surface corresponding to at least one of the embodiments of the present invention. FIG. 9(a) is a plan view of a state in which an image is projected from the projector 5 to the projected surface 2 in front view from the ceiling toward the floor surface.

The projected surfaces 2a to 2d are disposed so that the projected surfaces are perpendicular to each other so as to partition a space of a substantially rectangular parallelepiped shape. The projector 5 is suspended from the ceiling at substantially the center of the partitioned space and disposed so as to be capable of projecting an image onto the projected surfaces 2a to 2d installed on all sides.

FIG. 9(b) is a plan view of a state in which the image is projected from the projector 5 to the projected surface 2 as viewed from the front from the projected surface 2c toward the projected surface 2a. The projector 5 projects an image not only onto the projected surfaces 2a to 2d but also onto a floor surface 7. That is, the projector 5 projects an image onto five surfaces.

Figure 10:
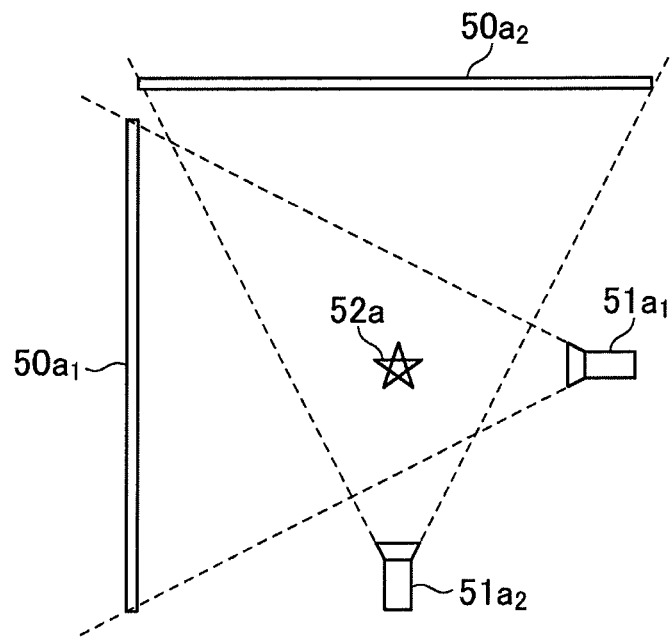
FIGS. 10A and 10B are diagrams illustrating concepts of a specific point, a virtual camera, and virtual screens corresponding to at least one of the embodiments of the present invention.
Figure 10:
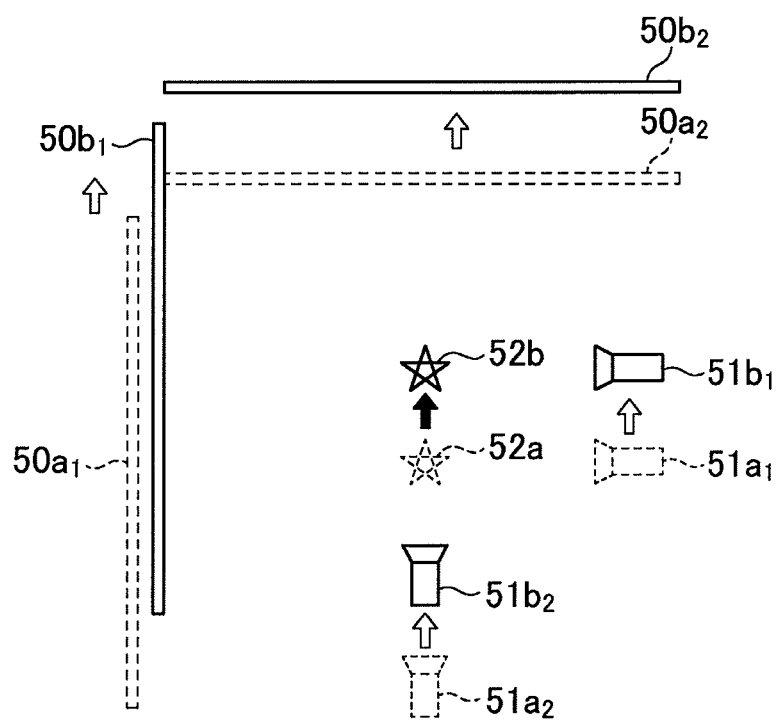

Next, the content of the image projected from the projector will be described. FIG. 10 are diagrams illustrating concepts of a specific point, a virtual camera, and virtual screens corresponding to at least one of the embodiments of the present invention.

FIG. 10(a) is a conceptual diagram for illustrating photographing by the virtual camera in the virtual three-dimensional space. In FIG. 10(a), virtual cameras $51a_1$ and $51a_2$ photograph a specific point $52a$ from different directions.

The image photographed by the virtual camera $51a_1$ is perspectively transformed on a virtual screen $50a_1$. In addition, an image photographed by the virtual camera $51a_2$ is perspectively transformed on a virtual screen $50a_2$.

Here, it is preferable that the relative positional relationship between the virtual camera $51a_1$ and the virtual screen $50a_1$ is the same as the relative positional relationship between the virtual camera $51a_2$ and the virtual screen $50a_2$. In addition, as in the case where the projected surfaces are perpendicular to each other, the virtual screen $50a_1$ and the virtual screen $50a_2$ are provided so as to be perpendicular to each other. By designing in this manner, it is possible to project the state of the virtual world on a plurality of projected surfaces without feeling discomfort.

Next, a change in the position of a specific point will be described. It is preferable that the position of the virtual camera changes while maintaining the relative positional relationship to the specific point. FIG. 10(b) is a conceptual diagram illustrating the change in the positions of the virtual camera and the virtual screen when the position of the specific point changes.

Since the position of the virtual camera maintains the relative positional relationship to the specific point in a case where the position of the specific point 52a is changed to the position of the specific point 52b by a user's input operation or program processing or the like, the position of the virtual camera $51a_2$ is changed to the position of a virtual camera $51b_2$ which is in front of the virtual camera $51a_2$. Similarly, the position of the virtual camera $51a_1$ is changed to the position of a virtual camera $51b_1$ which is the right side of the virtual camera $51a_1$.

In addition, the position of the virtual screen is also changed according to the change of the position of the virtual camera. When the position of the virtual camera $51a_1$ is changed to the position of the virtual camera $51b_1$, the position of the virtual screen $50a_1$ is changed to the position of the virtual screen $50b_1$ within the same plane. When the position of the virtual camera $51a_2$ is changed to the position of the virtual camera $51b_2$, the position of the virtual screen $50a_2$ is changed to the position of the virtual screen $50b_2$ within the same plane.

Further, the virtual screen corresponds to the projected surface 2, and the image perspectively transformed on the virtual screen is the same as the image projected from the projector 5.

Figure 11:
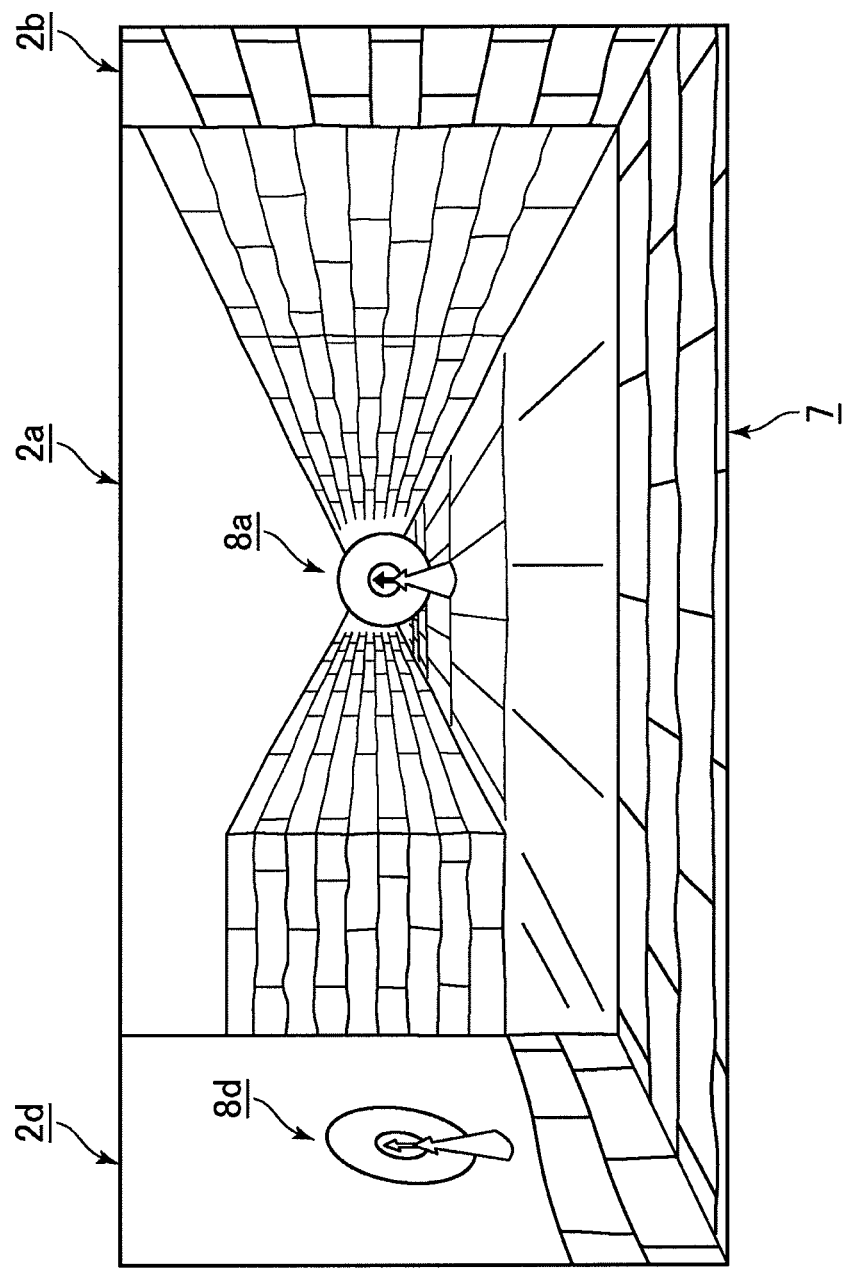
FIG. 11 is an example of a program execution screen corresponding to at least one of the embodiments of the present invention.

FIG. 11 is an example of a program execution screen corresponding to at least one of the embodiments of the present invention. In the figure, an image from a projector (not shown) is projected from the front projected surface 2a, the projected surface 2b on the right side toward the projected surface 2a, the projected surface 2d on the left side facing the projected surface 2a, and the floor surface 7, respectively. In addition, a photographing device (not shown) for photographing each projected surface 2 is disposed.

In addition, as an example, it is assumed that the user stands right below the projector and is surrounded by four projected surfaces. As illustrated in the figure, the image of the passage of the cave is displayed in the image.

On the front projected surface 2a, a state in which the path extends in the front-rear direction so as to be able to proceed is displayed. Similarly, on the projected surface 2d on the left side, a state in which the passageway extends in the left side direction so as to be able to proceed is displayed. The state in which it can proceed to the left side can be understood by the user also from the appearance of the front projected surface 2a.

On the other hand, on the right projected surface 2b, a state in which the wall surfaces are consecutive is displayed so as to be incapable of proceeding. The user can visually understand that the user cannot proceed beyond the wall.

An instruction display image 8 may be displayed so as to facilitate the determination as to whether passage is possible. For example, in FIG. 11, an instruction display image 8a displayed on the projected surface 2a is projected onto the projected surface so as to indicate that the user can further advance in the front direction.

Similarly, an instruction display image 8d displayed on the projection plane 2d on the left side is displayed on the projection plane so as to indicate that the user can further proceed in the left direction.

The user can instruct the direction to proceed by using the light beam irradiation device 1. The photographing device 3 photographs the light beam irradiated from the light beam irradiation device 1 onto the projected surface 2 and the computer apparatus 4 can recognize the instructed direction based on the photographed information. Instead of using the light beam irradiation device 1, the photographing device 3 may photograph a part of the user's hand or foot, so that the direction may be indicated.

In the case where the instruction display image 8a is displayed, when the front direction is instructed by the light beam irradiation device, the user proceeds in the front direction. In this case, the position of the virtual camera is also moved in the front direction, and an image according to the position of the user is projected on the projected surface.

In addition, the instruction display image 8d is displayed, when the left direction is instructed by the light beam irradiation device, the user proceeds in the left direction. In this case, the position of the virtual camera is also moved in the left direction, and an image according to the position of the user is projected on the projected surface.

In a case where the user satisfies a predetermined condition, the program may be designed to be terminated. For example, the predetermined condition may be such that the program is terminated in a case where the search of the virtual world has been completed. In addition, in the case of a program of a game in which a virtual battle is performed with an enemy character, the program may be terminated when the player defeats or loses to the enemy character. Furthermore, in the case of a game program having a time limitation, the program may be terminated in a case where the predetermined time has been reached.

Figure 12:
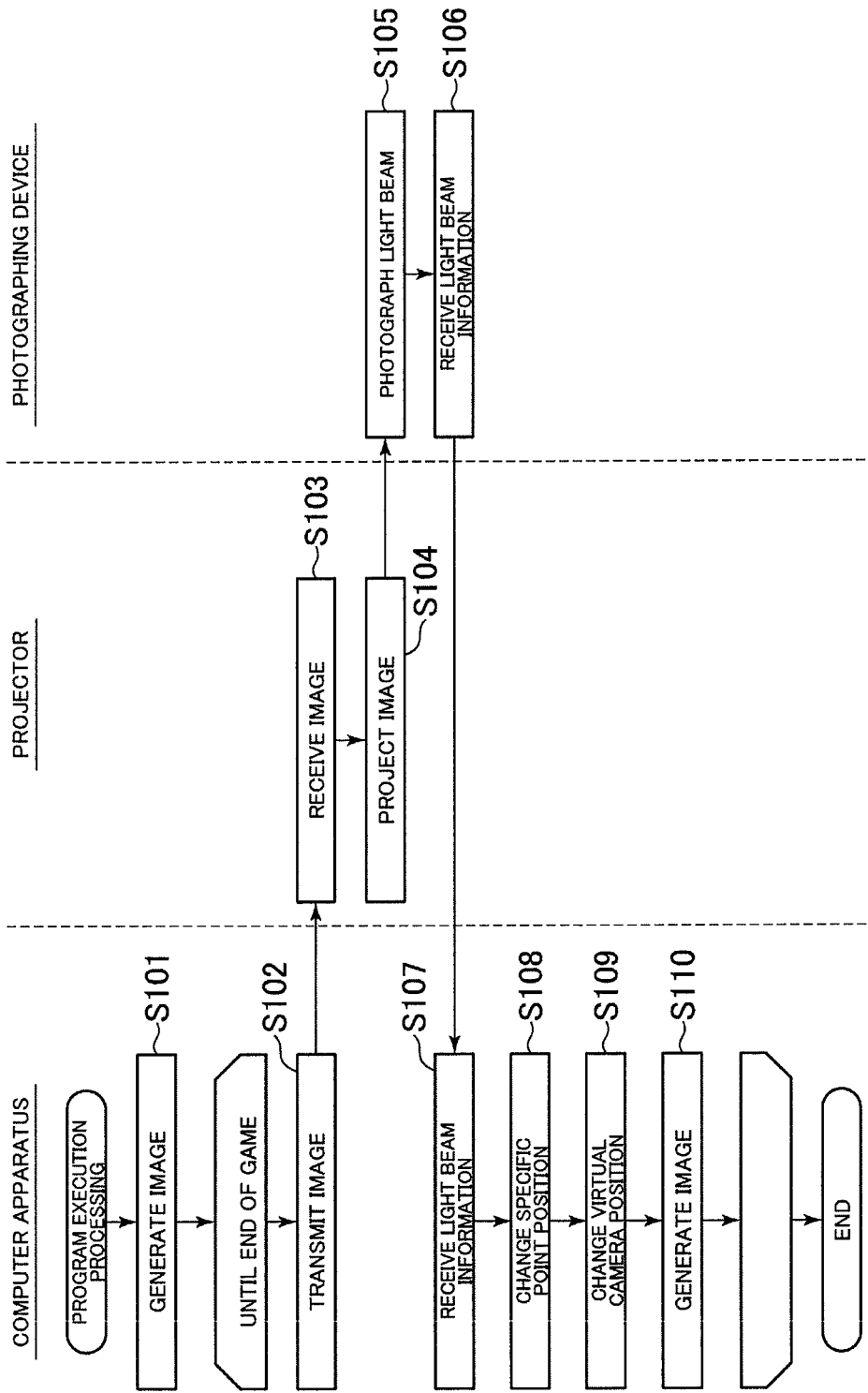
FIG. 12 is a flowchart of a program execution processing corresponding to at least one of the embodiments of the present invention.

Subsequently, the program execution processing according to the fifth embodiment of the present invention will be described. FIG. 12 is a flowchart of a program execution processing corresponding to at least one of the embodiments of the present invention.

First, when the program is executed, a graphics processor 14 of the computer apparatus 4 generates an image (step S101). Until the game is ended, the processing from step S102 to step S110 described below is repeated.

Next, the image is transmitted to the projector 5 via the communication interface 16 (step S102). Here, the communication line may be wired or wireless, and regardless of the type of line, in order to quickly perform the processing in the computer apparatus 4, it is preferable to use equipment which is capable of high-speed communication and hardly causing time lag.

When the image transmitted from the computer apparatus 4 is received in step S102 (step S103), the projector 5 projects the image onto the projected surface 2 (step S104).

When the user irradiates the projected image with the light beam using the light beam irradiation device 1, the photographing device 3 photographs the irradiated light beam (step S105). The photographing device 3 repeatedly executes photographing of the projected surface 2 at predetermined time intervals in order to determine whether the projected surface 2 is irradiated with the light beam.

The photographing device 3 transmits the information on the light beam photographed in step S105 to the computer apparatus 4 (step S106). The computer apparatus 4 receives the information on the light beam transmitted from the photographing device 3 in step S106 (step S107) and advances the program processing with the information on the light beam (hereinafter, referred to as light beam information) as the operation input information.

Using the light beam information as the operation input information means that an input is made in the irradiated direction based on, for example, the direction in which the light beam is irradiated. Alternatively, in a case where the position irradiated with the light beam is within the predetermined region of the projected surface 2, it can be designed so that it is determined that the input operation has been performed.

In addition, the user can use a plurality of light beam irradiation devices 1. As a method for identifying the irradiated light beam, there are methods such as designing the shape of the light beam to be emitted, the color of the emitted light beam, or the blinking pattern of the emitted light beam for each light beam irradiation device.

The computer apparatus 4 determines the operation input information from the light beam information received in step S107, and changes the position of the specific point according to the operation input information (step S108). Here, the position of the specific point may correspond to the position of the character operated by the user (hereinafter, referred to as the user character).

Here, the change of the position of the specific point will be further described. In a case where the position of the specific point corresponds to the position of the user character, for example, the position of the user character changes according to the input operation by the user, and the position for specifying the projection image changes. On the other hand, the case where the specific position does not correspond to the position of the user character means a case where the viewpoint of the virtual camera is switched, for example, by a user's input operation.

Further, the computer apparatus 4 changes the position of the virtual camera according to the position of the specific point changed in step S108 (step S109). The position of the virtual camera may be at a position corresponding to the viewpoint of the user character or may be at a position where the user character can be viewed objectively. By linking the position of the virtual camera and the position of the specific point, it is possible to freely move within the virtual world in accordance with the operation instruction by the user.

The computer apparatus 4 performs perspective transformation on the virtual screen from the position of the virtual camera changed in step S110 to generate an image to be projected (step S110). At this time, the position of the virtual camera corresponding to each projected surface 2 is changed according to the position of the specific point changed in step S108.

For example, in FIG. 11, in a case where the position of the virtual camera is changed such that the character advances by a distance of two steps forward with respect to the front projected surface 2a, the image projected on the projected surface 2d on the left side is changed and projected from the projected position in the direction of the front projected surface 2a by the distance corresponding to two steps of the character in the forward direction of the projection image of the front projected surface 2a. Similarly, the projection image of the projected surface 2b on the right side and the projection image of the floor surface 7 are changed and projected in conjunction with each other.

When the projection image is generated in step S110, the computer apparatus 4 transmits the generated projection image to the projector 5 (step S102).

As a game to which the fifth embodiment can be applied, for example, a game in which a plurality of players cooperate with each other or the game for one person can be assumed. Types of games include role-playing games (RPG), escape games that escape from a closed space, racing games, action games, and the like. In addition, it can be a simulation program that creates the feeling of being in a live venue using a live video image of an artist.

As a program used to realize the fifth embodiment, for example, it is preferable to use Flash (registered trademark) ActionScript, JavaScript (registered trademark), Unity, or the like. The language may be a similar language, or it may be realized in the existing C language or the like.

In the fifth embodiment, the visible light and the invisible light can be irradiated from the light beam irradiation device 1, but it is possible to irradiate only invisible light. In this case, for example, the irradiation position of the invisible light is recognized by the computer apparatus 4 from the photographing data of the photographing device 3 that photographs the invisible light. Then, when generating a projection image on the projector 5, the projection image obtained by combining aiming images may be generated.

As one aspect of the fifth embodiment, the user can experience the realistic feeling that the user is moving in the virtual world, and can enhance user's interest.

As one aspect of the fifth embodiment, by changing the position of a specific point for specifying the projection image to be projected on the projected surface and changing the position of the virtual camera according to the position of the specific point, it is possible to provide a feeling that the user is moving in the virtual world, and it is possible to enhance the realistic feeling of the projection image and further enhance the user's interests.

As one aspect of the fifth embodiment, two or more projected surfaces are provided with a predetermined angle, the relative positional relationship of the first virtual screen to the first virtual camera and the relative positional relationship of the second virtual camera to the second virtual screen are the same, and the virtual screens have the same angle as the angle formed by the projected surfaces. Therefore, since the positional relationship between the projected surfaces in the real world and the positional relationship between the virtual cameras in the virtual world can be made to correspond to each other, it is possible to project the state of the virtual world on a plurality of projected surfaces without causing discomfort.

As one aspect of the fifth embodiment, by changing the position of the virtual camera while maintaining the positional relationship of the virtual camera to the specific point, the position of the virtual camera can be changed by changing the specific point by the operation instruction of the user, and it is possible to provide a feeling that the user is moving in the virtual world, and it is possible to enhance the realistic feeling of the projection image and further enhance the user's interests.

As one aspect of the fifth embodiment, by moving the user character in the virtual three-dimensional space according to the operation input by the user, the user can more easily experience the virtual world full of realistic feeling and can further enhance the user's interests.

As one aspect of the fifth embodiment, by receiving a light beam photographed by the photographing device as an operation input, it can be applied irrespective of the location as long as the photographing apparatus can photograph a light beam. Therefore, the user can more easily experience the virtual world full of realistic feeling and can further enhance the user's interests.

As one aspect of the fifth embodiment, by changing the position of a specific point in the direction perpendicular to the virtual screen corresponding to the projected surface irradiated with the light beam, the user can use the system with intuitive operation, and can more easily experience the virtual world full of realistic feeling.

As one aspect of the fifth embodiment, a projected surface is provided in four directions so that one projected surface and another projected surface are perpendicular to each other, that is, so as to surround the user, and furthermore, by projecting an image also onto the floor surface, the user can more easily experience the virtual world full of realistic feeling and can further enhance the user's interests.

In the fifth embodiment, the "projection", "image", "projected surface", "projector", "communication", "connection", "computer apparatus", "specific point", "change position" and "transmission" are the same as those described in the first embodiment, respectively.

In the fifth embodiment, the "virtual three-dimensional space", "virtual camera", "virtual screen", "perspective transformation" and "generating an image" are the same as those described in the second embodiment, respectively.

In the fifth embodiment, the "operation input" refers to, for example, an input performed on a projected image. The "user character" refers to, for example, a character existing as a substitute for a user or a sub character according to a character, and includes an object that shares an action with a character.

In the fifth embodiment, the "light beam irradiation device" refers to, for example, a device that irradiates a light beam, including a portable device and a device used by being installed. The "photographing device" means a device capable of photographing, such as a video camera, an infrared sensor camera, or the like. The "game program" refers to, for example, a program for executing a game, which is executed in a computer apparatus.

Sixth Embodiment

Next, the outline of a sixth embodiment of the present invention will be explained. Similar to the fifth embodiment, in the sixth embodiment, at least two projected surfaces are provided, and one projected surface and the other projected surface are set to have a predetermined angle.

Next, the outline of the sixth embodiment of the present invention will be described. The configuration of the system according to the sixth embodiment can adopt the same configuration as that illustrated in the block diagram of FIG. 7.

Here, the light beam irradiation device 1 may be provided with at least either an acceleration sensor or an optical sensor. In addition, the information measured by the sensor may be transmitted to the computer apparatus 4 by communication.

Alternatively, a controller for a virtual reality (VR) including at least either the acceleration sensor or the optical sensor may be used instead of the light beam irradiation device 1.

The configuration of the computer apparatus according to the sixth embodiment of the present invention can adopt the same configuration as that illustrated in the block diagram of FIG. 8. In addition, the concept of projecting an image on the projected surface from the projector can adopt the same concept as illustrated in the block diagrams of FIG. 9. Furthermore, the concept of the specific point, the virtual camera, and the virtual screen in the sixth embodiment can adopt the same configuration as illustrated in the conceptual diagrams of FIG. 10.

Next, the execution processing of the program according to the sixth embodiment of the present invention will be described. The flow of the program execution processing in the sixth embodiment can adopt the same configuration as that illustrated in the flowchart of FIG. 12.

Incidentally, in the case of using, for example, a controller for VR equipped with the acceleration sensor or the optical sensor as an input device instead of the light beam irradiation device 1 in step S105, the information measured by the sensor of the VR controller may be used as the operation input information without photographing of light beams by the photographing device 3. In this case, in step S106, the operation input information by the VR controller is transmitted to the computer apparatus 4 by communication.

For example, in a case where the acceleration sensor detects that the controller has been moved from the front direction to the right side surface direction by the user, specific point is advanced in the right direction, and in a case where the acceleration sensor detects that the controller is swung down from the upper side by the user, the character jumps forward. Alternatively, the operation input information may be determined based on the relative positional relationship between the position of one controller and the position of the other controller by using a plurality of controllers.

In addition, it is also possible to determine the operation input information based on the relative positional relationship of the controller with respect to the reference position (hereinafter, referred to as the reference position). For example, in a case where the center point of the image projected on the floor surface is set as the reference position, the operation input information can be determined based on the relative positional relationship between the reference position and the position of the controller in the same plane as the floor surface on which the image is projected.

For example, the direction from the reference position to the position of the controller projected on the same plane as the floor surface can be set as the input direction. In addition, in a case where it is detected that the position of the controller has moved within the predetermined speed range, these movement information items can be used as the operation input information. Alternatively, for example, the distance between the position of the controller projected on the same plane as the floor surface and the reference position may be used as the input amount.

The positional relationship relative to the reference position is not limited to the position information of the plane. For example, in a case where the position of the controller is relatively low with respect to the height of the reference position, the specific operation input information may be determined. More specifically, the photographing device 3 can specify the position of a head of the user as the reference position, and the operation input information can also be determined based on the positional relationship with the controller held by the user in the hand.

As one aspect of the sixth embodiment, by using a controller capable of performing operation input according to the position and movement of the controller, the user can experience the virtual world full of realistic feeling and can further enhance the user's interesting.

APPENDIX

The description of the embodiments described above has been described so that those having ordinary knowledge in the field to which the invention belongs can carry out the following invention.

[1] A program to be executed on a computer apparatus capable of communicating or connecting with a projector that projects a projection image onto a projected surface, the program causing the computer apparatus to function as:

a specific point position changer that changes a position of a specific point for specifying the projection image to be projected onto the projected surface; and a transmitter that transmits an image in accordance with the position of the specific point to a projector as the projection image.

[2] The program according to [1], the program further causing the computer apparatus to function as:

a virtual camera position changer that changes a position of a virtual camera according to the change of the position of the specific point; and an image generator that generates an image by perspective transformation of a virtual three-dimensional space from the virtual camera onto a virtual screen, wherein the transmitter transmits the generated image to the projector as the projection image.

[3] The program according to [2], wherein at least two or more projected surfaces exist as the projected surface, and one projected surface and the other projected surface are disposed at a predetermined angle, wherein the image generator includes a first image generator that generates the image by perspective transformation from a first virtual camera corresponding to one projected surface onto a first virtual screen, and a second image generator that generates the image by perspective transformation from a second virtual camera corresponding to the other projected surface onto a second virtual screen, wherein a relative positional relationship of the first virtual screen with respect to the first virtual camera and the relative positional relationship of the second virtual screen with respect to the second virtual camera are the same, and wherein the first virtual screen and the second virtual screen have the same angle as the predetermined angle.

[4] The program according to [2], wherein the virtual camera position changer changes the position of the virtual camera while maintaining the relative positional relationship of the virtual camera with respect to the specific point.

[5] The program according to any one of [1] to [4], the program further causing the computer apparatus to function as:

an operation input receiver that receives an operation input of a user; and a character mover that moves a user character in the virtual three-dimensional space according to the received operation input, wherein the position of the specific point is in correspondence with the position of the user character.

[6] The program according to any one of [1] to [5], further comprising:

a photographing device that photographs an irradiated light beam from a light beam irradiation device onto the projected surface, wherein the operation input receiver receives the light beam photographed by the photographing device as the operation input.

[7] The program according to [6], wherein at least two or more projected surfaces exist as the projected surface, and wherein the specific point position changer changes the position of the specific point in a direction perpendicular to the virtual screen corresponding to the projected surface irradiated with the light beam.

[8] The program according to any one of [3] to [7], wherein one projected surface and the other projected surface are disposed so as to be perpendicular to each other.

[9] A computer apparatus capable of communicating or connecting with a projector that projects a projection image onto a projected surface, the apparatus comprising:

a specific point position changer that changes a position of a specific point for specifying the projection image to be projected onto the projected surface; and a transmitter that transmits an image in accordance with the position of the specific point to a projector as the projection image.

[10] A program execution method to be executed on a computer apparatus capable of communicating or connecting with a projector that projects a projection image onto a projected surface, the method comprising:

a step of changing a position of a specific point for specifying the projection image to be projected onto the projected surface; and a step of transmitting an image in accordance with the position of the specific point to a projector as the projection image.

[11] A computer system comprising:

a projector that projects a projection image onto a projected surface; and a computer apparatus capable of communicating or connecting with the projector, wherein the computer apparatus includes a specific point position changer that changes a position of a specific point for specifying the projection image to be projected onto the projected surface, and a transmitter that transmits an image in accordance with the position of the specific point to a projector as the projection image, and wherein the projector includes a projecting unit that projects the received image onto the projected surface.

REFERENCE SIGNS LIST

1 LIGHT BEAM IRRADIATION DEVICE
11 CONTROLLER
12 RAM
13 STORAGE UNIT
14 GRAPHICS PROCESSOR
15 VIDEO MEMORY
16 COMMUNICATION INTERFACE
17 PERIPHERAL DEVICE CONNECTION INTERFACE
18 PERIPHERAL DEVICE
2 PROJECTED SURFACE
3 PHOTOGRAPHING DEVICE
4 COMPUTER APPARATUS
5 PROJECTOR
6 COMMUNICATION LINE
7 FLOOR SURFACE
8 INSTRUCTION DISPLAY IMAGE

The invention claimed is:

1. A non-transitory computer-readable recording medium including a program to be executed on a computer apparatus capable of communicating or connecting with a projector that projects a projection image onto a projected surface, the program causing the computer apparatus to perform operations comprising:
- changing a position of a specific point for specifying the projection image to be projected onto the projected surface; and
- transmitting images in accordance with the position of the specific point to the projector as the projection image,
- wherein the position of the specific point changes in accordance with an operation instruction by a user,
- wherein the projected surface includes a pair of projected surfaces, the pair of projected surfaces being perpendicularly aligned,
- wherein the images are photographed by a pair of virtual cameras and projected on the pair of projected surfaces, and
- wherein positions of the pair of virtual cameras are changed in accordance with the operation instruction by the user.

2. The non-transitory computer-readable recording medium according to claim 1, the operations further comprising:
- generating the images by perspective transformation of a virtual three-dimensional space from the pair of virtual cameras onto virtual screens.

3. The non-transitory computer-readable recording medium according to claim 2,
- wherein the positions of the pair of virtual cameras are changed while maintaining a relative positional relationship with respect to the specific point.

4. The non-transitory computer-readable recording medium according to claim 3, wherein positions of the pair of projected surfaces are changed according to changes of the positions of the pair of virtual cameras.

5. The non-transitory computer-readable recording medium according to claim 2,
- wherein a first projected surface and a second projected surface being are disposed at a predetermined angle,
- wherein the generating includes
  - first generating a first image by perspective transformation from a first virtual camera corresponding to the first projected surface onto a first virtual screen, and
  - second generating a second image by perspective transformation from a second virtual camera corresponding to the second projected surface onto a second virtual screen,
- wherein a first relative positional relationship of the first virtual screen with respect to the first virtual camera and a second relative positional relationship of the second virtual screen with respect to the second virtual camera are same, and
- wherein the first virtual screen and the second virtual screen have a same angle as the predetermined angle.

6. The non-transitory computer-readable recording medium according to claim 5,
- wherein the first projected surface is perpendicular to the second projected surface.

7. The non-transitory computer-readable recording medium according to claim 1, the operations further comprising:
- receiving the operation instruction of the user; and
- moving a user character in a virtual three-dimensional space according to the operation input,
- wherein the position of the specific point is changed in correspondence with a position of the user character.

8. The non-transitory computer-readable recording medium according to claim 1,
- wherein a light beam photographed by a photographing device that photographs an irradiated light beam, from a light beam irradiation device onto the projected surface, is received as the operation instruction.

9. The non-transitory computer-readable recording medium according to claim 8,
- wherein the position of the specific point is changed in a direction perpendicular to a virtual screen corresponding to the projected surface irradiated with the light beam.

10. The non-transitory computer-readable recording medium according to claim 1, wherein positions of the pair of projected surfaces are changed in accordance with the operation instruction by the user.

11. A computer apparatus capable of communicating or connecting with a projector that projects a projection image onto a projected surface, the apparatus comprising:
- a processor; and
- a memory including a set of instructions that, when executed by the processor, causes the processor to perform operations, the operations including:
  - changing a position of a specific point for specifying the projection image to be projected onto the projected surface; and
  - transmitting images in accordance with the position of the specific point to the projector as the projection image,
  - wherein the position of the specific point changes in accordance with an operation instruction by a user,
  - wherein the projected surface includes a pair of projected surfaces, the pair of projected surfaces being perpendicularly aligned,
  - wherein the images are photographed by a pair of virtual cameras and projected on the pair of projected surfaces, and
  - wherein positions of the pair of virtual cameras are changed in accordance with the operation instruction by the user.

12. The computer apparatus according to claim 11, wherein positions of the pair of projected surfaces are changed in accordance with the operation instruction by the user.

13. A program execution method to be executed on a computer apparatus capable of communicating or connecting with a projector that projects a projection image onto a projected surface, the program execution method comprising:
- changing a position of a specific point for specifying the projection image to be projected onto the projected surface; and
- transmitting images in accordance with the position of the specific point to the projector as the projection image,
- wherein the position of the specific point changes in accordance with an operation instruction by a user,
- wherein the projected surface includes a pair of projected surfaces, the pair of projected surfaces being perpendicularly aligned,
- wherein the images are photographed by a pair of virtual cameras and projected on the pair of projected surfaces, and
- wherein positions of the pair of virtual cameras are changed in accordance with the operation instruction by the user.

14. The program execution method according to claim 13, wherein positions of the pair of projected surfaces are changed in accordance with the operation instruction by the user.

15. A computer system, comprising:
- a projector that projects a projection image onto a projected surface; and
- a computer apparatus capable of communicating or connecting with the projector,
- wherein the computer apparatus
    - changes a position of a specific point for specifying the projection image to be projected onto the projected surface, and
    - transmits images in accordance with the position of the specific point to the projector as the projection image,
- wherein the projector projects the image onto the projected surface, and
- wherein the position of the specific point changes in accordance with an operation instruction by a user,
- wherein the projected surface includes a pair of projected surfaces, the pair of projected surfaces being perpendicularly aligned,
- wherein the images are photographed by a pair of virtual cameras and projected on the pair of projected surfaces, and
- wherein positions of the pair of virtual cameras are changed in accordance with the operation instruction by the user.

16. The computer system according to claim 15, wherein positions of the pair of projected surfaces are changed in accordance with the operation instruction by the user.

* * * * *